United States Patent Office 3,480,555
Patented Nov. 25, 1969

3,480,555
SOLS OF GAMMA FERRIC OXIDE AND THEIR PREPARATION
William M. Jackson and Frank W. Hengeveld, Painesville, Ohio, assignors to Diamond Shamrock Corporation, Cleveland, Ohio, a corporation of Delaware
No Drawing. Filed May 11, 1964, Ser. No. 370,143
Int. Cl. H01f 1/34; B01j 1/04
U.S. Cl. 252—62.56                24 Claims

ABSTRACT OF THE DISCLOSURE

Stable magnetic gamma ferric oxide aquasols are prepared by treating an aqueous solution of ferric and ferrous salts in which the molar ratio of ferric ions to ferrous ions is between 3:1 and 1:1 with an anion exchange resin. The pH of the mixture during ion exchange is between 7.5 and 9.5 and the sol is stabilized by rapidly reducing its pH to between 1 and 3. The aquasol may be dialyzed to form a gel and the gel contacted with a solution of a lyophillic anionic transfer agent in an organic liquid to form a stable organosol of gamma ferric oxide.

---

This invention relates to novel magnetic compositions of matter and methods for their preparation, and more particularly to stable gamma ferric oxide aquasols and organosols.

Ferric oxide, $Fe_2O_3$, is known to exist in at least three forms: alpha, beta and gamma. Of these, only the gamma form is magnetic. Several methods of the preparation of gamma ferric oxide have been described; they include controlled oxidation of magnetite, ferrous oxide or ferrous salts and hydrolysis of ferric salts, followed by reduction to magnetite and controlled oxidation at elevated temperatures. But it has heretofore been impossible to prepare sols of gamma ferric oxide which were stable for more than a few hours. Further, all stable ferric oxide sols of the prior art are non-magnetic.

A principal object of the present invention, therefore, is to prepare stable gamma ferric oxide aquasols and organsols.

Another object of the invention is to provide novel methods for the preparation of gamma ferric oxide aquasols and organosols.

A further object of the invention is to provide a method whereby hydrous gamma ferric oxide powders can be prepared from sols.

Still another object is to provide a method for the preparation of stable, relatively pure gamma ferric oxide sols of high concentration.

These and other objects and advantages of the invention will more fully appear from the following description thereof.

The term "stable" as used in the specification and claims is intended to mean a sol the particles of which remain dispersed in the liquid medium, without settling out, for a period of at least several months and which show no evidence of increase in size as determined by electron microscopy.

The method of this invention is based on the unexpected discovery that stable magnetic gamma ferric oxide aquasols may be prepared by treating an aqueous solution of a ferric salt with an anion exchange resin under conditions such that (1) the aqueous ferric salt solution contains a ferrous salt in a quantity to provide a ratio of ferric ion to ferrous ion within the range from about 3:1 to 1:1, inclusive; (2) the pH of the reaction mixture during ion exchange is within the range from about 7.5 to 9.5, inclusive; and (3) the final pH of the aquasol is within the range from about 1 to 3, inclusive.

Accordingly, the novel sols of this invention are prepared by (A) slowly adding an aqueous solution of ferric and ferrous salts, in which the molar ratio of ferric ion to ferrous ion is between about 3:1 and 1:1, inclusive, to a vigorously agitated aqueous slurry of an anion exchange resin, preferably a strong base anion exchange resin in the hydroxide form, said addition being carried out at a rate and temperature such that the pH of the mixture is maintained between about 7.5 and 9.5 and preferably about 8.0 to 8.7; and (B) stabilizing the sol thus formed by rapidly reducing its pH to between 1 and 3.

The known magnetic forms of iron oxide are magnetite ($Fe_3O_4$) and gamma ferric oxide ($\gamma$-$Fe_2O_3$). Their magnetic properties are attributable to the presence of a spinel crystal structure. The magnetite unit cell contains 32 oxygen atoms and 24 iron atoms arranged such that eight of the iron atoms are surrounded tetrahedrally by four oxygen atoms and 16 of the iron atoms are surrounded octahedrally by six oxygen atoms. In all the prior processes for preparation of gamma ferric oxide, at some point in the process, oxygen is added to the magnetite unit cell without destroying the structure to produce a relatively iron poor defect structure.

The method for producing the novel gamma ferric oxide sols described above differs from previous methods in that no oxidation step is required. Although the mechanism is not understood, apparently an initial simultaneous crystallization of ferrous and ferric oxides occurs which establishes the magnetite spinel structure, to which through some preferential process only ferric oxide is added. Carrying out the process with inert gas purged solutions of ferrous and ferric salts and under an inert gas such as nitrogen, produce gamma ferric oxide sols which are indistinguishable from those produced in the presence of oxygen. In fact the use of an inert atmosphere has one advantage in that the desired ferrous-ferric ratio in the solution can be maintained with assurance that it has not changed prior or during the production of the sol.

Ion exchange resins may be classified in terms of their $T\frac{1}{2}$ value, with $T\frac{1}{2}$ being defined as the time in seconds required to use one-half of the exchange capacity of a given resin at constant temperature. This value is determined by adding hydrochloric acid to the resin and noting the time required for the pH to reach a value of 7. The following table lists the $T\frac{1}{2}$ values and total exchange capacity for various resins.

| Resin Description | $T\frac{1}{2}$ at 25° C. Reagent, HCl (seconds) | Total Exc. Cap. observed Reagent, HCl, meq./ml.* | Total Exc. Cap. anticipated Lit. value, meq./ml. |
|---|---|---|---|
| Duolite A–101D, sized new resin | 39.7 | 1.27 | 1.30 |
| Duolite A–101D, used for many runs | 30.5 | 1.39 | 1.30 |
| Duolite A–102D, sized new resin | 51.4 | 1.34 | 1.30 |
| Dowex 2X8 | 48.5 | 1.50 | 1.33 |
| Duolite A–30B | ($T\frac{1}{10}$=47.1) | 2.28 | 2.8 |
| Amberlite IRA–400 | 31.2 | 1.68 | 1.0 |
| Amberlite IRA–402 | 31.5 | 1.52 | 1.25 |
| Amberlite IRA–410 | 30.9 | 1.60 | 1.35 |
| Ionac A–300 | ($T\frac{1}{10}$>600) | 2.40 | |
| Ionac A–540 | 61.7 | 1.45 | |
| Ionac A–550 | 56.7 | 1.47 | |

*Milliequivalents per milliliter.

Duolite A–101D and A–102D (Diamond Alkali Company); Amberlite IRA–400, 402 and 410 (Rohm &

Haas); Ionac A–540 and A–550 (Pfaudler Permutit Company) and Dowex 2X8 (Dow Chemical Company) are classed as strong-base anion exchange resins. Duolite A–30B (Diamond Alkali Company) and Ionac A–300 (Pfaudler Permutit Company) are classed as intermediate-base resins. The T½ value of Duolite A–30B and Ionac A–300 could not be determined because of their slow rate of exchange. These resins are styrene divinyl benzene copolymers containing quaternary ammonium groups introduced by chloromethylating the copolymer and treating it with a tertiary amine. Copolymers of vinyl pyridine and divinyl benzene, treated with methyl sulfate are also examples of suitable strong-base resins.

While Duolite A–101D and A–102D and Dowex 2X8 are all classed as strong-base resins, these resins cannot be used interchangeably at a given temperature because of the significant differences in their exchange rates. For example, it has been found that Duolite A–101D may be employed at room temperature to prepare the products of this invention, whereas to produce similar products using Dowex 2X8 a temperature of 35° C. must be used. Resins having a T½ value at room temperature, i.e., 25° C. of 70 or less may be employed in the process of this invention.

Investigation of the rate at which successive portions of the exchange capacity of the resin are exchanged show that the exchange rates fall off rapidly after about 50 percent of the exchange capacity has been used. For example, with Dowex 2X8 resin at 22° C. the first 50 percent of the exchange capacity can be exchanged in 48 seconds, but the second 50 percent of exchange capacity requires more than 250 seconds. Because of this rapid drop in exchange rate, an excess of anion exchange resin, based on the concentration of the anion to be removed, is preferred. The excess may be as little as about 3 percent or as great as about 200 percent and is preferably in the range of about 100 percent to 150 percent.

The ion exchange resin is slurried with water before the introduction of the iron salt solution. The volume ratio of resin to water in the slurry is also of importance, since too high a ratio will result in the formation of a viscous, gruellike mass as the iron salt solution is added. If such a mass is formed, agitation becomes difficult and pH control erratic. In general, a resin to water volume ratio of about 2.2:1 is the highest that can be conveniently employed.

In preparing the iron salt solution which is to be reacted with the anion exchange resin, any soluble ferric and ferrous salts of monovalent anions may be employed; examples are the chlorides and nitrates. The molar ratio of ferric ion to ferrous ion is, as stated hereinabove, between about 3:1 and 1:1, and is perferably about 2:1. The total iron concentration (sum of ferric and ferrous ion concentrations) in the solution is desirably about 0.5 to 3 M.

The resin-water slurry should be vigorously agitated as the iron-salt solution is added. The importance of proper mixing and agitation on exchange rate of a resin can be demonstrated by determining T½ values at various agitator speeds in an apparatus of constant geometry. Using Duolite A–101D at 25° C., a speed of 100 r.p.m. gives a T½ value of about 70 seconds and a speed of 200 r.p.m. gives a T½ value of about 47 seconds. The T½ value becomes essentially constant at 40 seconds, using speeds of 260 r.p.m. and above. The reaction mixture may be maintained in an inert atmosphere, e.g., nitrogen or helium, if desired, but such is not necessary.

Careful control of the pH of the reaction mixture is essential to the success of the method of this invention. Before the addition of the iron salt solution, the resin slurry will have a pH of about 10.0 or higher. As the first portions of iron salt solution are added, the pH drops quite suddenly and must be maintained in the range of about 7.5 to 9.5 by control of the agitation, temperature and iron salt addition rate. The temperature which results in the best pH control is dependent upon the resin used. The preferred temperature range for a particular resin is that at which the T½ value is comparable to the value for Duolite A–101D at a temperature between 20° and 30° C. With suitable agitation an iron salt addition rate of about 1 to 2 ml. per second per 100 ml. of resin is generally suitable for maintenance of the proper pH.

Although a pH of about 7.5 to 9.5 is necessary for the formation of the gamma ferric oxide aquasol, the sol is not stable at this pH for more than a day or so. It has been found essential, for the purpose of stabilizing the sol, to reduce its pH to between about 1 and 3, preferably about 1.5, after formation.

The pH of the sol may be reduced by adding any suitable water-soluble acidic material having monovalent anions. Examples of such substances are (1) mineral acids such as hydrochloric acid or nitric acid; (2) acidic metal halides such as ferrous or ferric chloride; and (3) mixtures of compounds from groups (1) and (2). For example, a mixture of ferric and ferrous salt solutions, containing ferric and ferrous ions in the same ratio as the iron salt solution from which the sol was prepared, is particularly useful if facilities for accurate pH measurement are not available during this stage of the process, since the acidity of these materials is such that over-acidification, i.e., below a pH of 1, cannot take place. Presently preferred are hydrochloric acid and/or iron salt mixtures.

Particularly if facilities exist for pH measurement during the entire course of the reaction, a strong acid may be used to lower the sol pH. A mixture of equal volumes of the ferric-ferrous salt feed solution and a concentrated mineral acid, such as concentrated hydrochloric acid (11 6 N), has been found especially suitable.

It should be noted that the period starting with the completion of the ion exchange reaction and ending when the final sol pH of between about 1 and 3 is reached is the most critical period in the method of this invention. As has been pointed out hereinabove, the sol is not very stable at a pH of 7.5 to 9.5. In the process of stabilization, the acidity of the solution must pass through the precipitation point of ferric oxide, which occurs at a pH of about 3.8. This point must be passed as rapidly as possible in order to avoid precipitation. At the same time, the pH must not go below about 1. In practice, it has been found necessary to make the transition from a pH of about 8 to about 3 as rapidly as possible, desirably within a few minutes and preferably within about one minute.

The novel gamma ferric oxide aquasols of this invention, when prepared by the method described hereinabove, have a maximum ferric oxide concentration of about 15 grams per liter, and may be concentrated by simple evaporation to about 30 grams per liter. Higher concentrations may be prepared after removal of free ions by a procedure such as dialysis which is described below. The average ferric oxide particle size is between about 3 and 12 millimicrons.

The sols are black liquids by reflected light and exhibit the light-scattering behavior characteristic of colloids. By transmitted light the sols are transparent and reddish in color. They are stable for several months at room temperature but are readily flocculated by salts such as potassium or magnesium sulfate. The sol particles have been shown by X-ray diffraction to have the spinel structure which is characteristic of both gamma ferric oxide and magnetite, and the intensities of the diffraction lines correspond to the values for gamma ferric oxide.

Solid hydrated gamma ferric oxide may be obtained from the aquasol by adding alkali until the isoelectric point (pH of about 3.8) is reached, whereupon the oxide precipitates, by evaporating the sol in air or by adding small amounts of a salt or acid having a divalent or trivalent anion. The former method is preferred since it gives an oxide of greater purity. The solid may be dried at temperatures up to about 200° C.

Analysis of the powder and of the aqueous phase from which the powder has been separated confirms the structure of the sol. It is observed that nearly all of the bivalent iron remains in solution and nearly all the trivalent iron is in the solid phase. If the discontinuous phase of the sol were magnetite, it would be expected that the solid phase would contain trivalent and bivalent iron in a 2:1 molar ratio.

In addition to being dilute, the gamma ferric oxide aquasols prepared by the method described hereinabove are contaminated with extraneous ions, chiefly ferric and ferrous ions and anions such as chloride. It has been found, however, that highly stable, concentrated, pure aquasols may be prepared from the aforesaid dilute sols by dialysis and redispersion.

Dialysis may be effected through any common dialysis membrane material or by electrodialysis using anion and cation permeable membranes. The process is conveniently carried out at temperatures within the range from about 10° to 30° C.

As dialysis proceeds, the sol precipitates as a soft gel; the process is complete when precipitation ceases. The pH increases during dialysis to a final value of about 6 to 7. The precipitated product may be separated from excess liquid by decantation or centrifugation; decantation may conveniently be assisted by magnetic attraction of the solid particles. The product is highly magnetic and contains about 10 to 15 percent (by weight) of ferric oxide.

The dialysis method may be adapted to continuous operation by circulating the sol through dialysis tubing in a continuous stream of heated water, the latter being agitated by the passage of a gas such as air or an inert gas.

Redispersion may be accomplished by adding aqueous acid to the gel or by passing an acidic gas therethrough. Acidification to a pH of between about 1 and 3, preferably about 1.5, will result in reconversion of the gel to a sol. The redispersed product is of substantially the same particle size as the original sol and has a ferric oxide concentration which may be as high as that of the gel (about 10 to 15 percent). Still more concentrated sols (up to about 35 percent ferric oxide) may be prepared by removal of water, either by low-temperature (below about 70° C.) evaporation in vacuo or by the action of a strong desiccant such as sodium or magnesium perchlorate.

Organosols of gamma ferric oxide may be prepared in accordance with the invention by treating the gel with a solution of a lyophillic transfer agent in an organic liquid, preferably a non-polar liquid such as an aliphatic or aromatic hydrocarbon. Toluene is a typical liquid. Suitable transfer agents include, for example, ammonium salts of long-chain fatty acids of which ammonium oleate is typical. In general, the amount of transfer agent required is about 20 to 50 percent of the weight of ferric oxide in the gel.

According to the method of this invention, the gamma ferric oxide gel is agitated with the solution of transfer agent. The counterions of the aqueous layer are replaced by organic anions of the organic phase, and the result is a transfer of the ferric oxide to the organic liquid. In some instances, a number of treatments with transfer agent and organic solvent may be necessary to disperse the entire gel.

Occasionally, treatment of the gel with the organic solution may result in the formation of an emulsion which is difficult to resolve. In such cases, an additional portion of organic solvent may be introduced to break the emulsion. Azeotropic distillation of water is also frequently effective in breaking the emulsion or increasing the amount of ferric oxide dispersed.

Gamma ferric oxide organosols prepared by the foregoing method have a ferric oxide concentration up to about 6 percent by weight, and a ferric oxide particle size identical to that of the original aquasol. By evaporation of solvent in vacuo, organosols with an $Fe_2O_3$ concentration as high as 38 percent may be obtained.

The sols of this invention have low residual magnetization characteristics, i.e., a negligible coercive force and remanence, and thus are superparamagnetic. The solids made from said sols have magnetic properties which to some extent depend on the method of isolation and the inherent opportunities for particle growth. The magnetic properties of a typical solid obtained by adjustment of the pH to the isoelectric point had a coercive force of about 40 oersteds and a remanence of about 485 gauss. The calculated maximum induction of the solids was about 3700 gauss.

The sols of this invention are of potential use wherever a liquid with magnetic properties is desired or advantageous. Thus, they may be used in electronic apparatus where low energy loss is required; in rocket fuels for restarting engines at zero gravity; in floor waxes for areas such as hospitals where it is necessary to eliminate static electricity, or in more advanced magnetic sound recording tapes. They may also be dispersed in vinyl plastisols for deposition on paper to form electrically sensitive coatings. Other possible applications are in the manufacture of thin film devices and high-frequency transformer cores, as colorants for plastics or lacquers, in magnetohydrodynamic research, and as fluids for magnetic pumps, gyroscopes, magnetic clutches and duplication equipment.

The invention is illustrated by the following examples.

EXAMPLE 1

A one-liter, three-necked Morton flask is fitted with a variable-speed motor-driven stirrer, a delivery tube and a nitrogen inlet. The flask is charged with 400 ml. (tapped volume) of Duolite A–101D anion exchange resin in the hydroxide form, having an exchange capacity of 0.97 mg. per ml.; 180 ml. of water is added and the system is purged with nitrogen while gently stirring. Electrodes for continuous pH measurement are introduced into the resin-water slurry.

With vigorous stirring an 80-ml. volume of aqueous solution approximately 0.5 M in ferric chloride and 0.25 M in ferrous chloride is added over a period of 102 seconds. The initial pH between 10.5 and 11.0 drops immediately and the addition rate is adjusted to maintain the pH between 8.0 and 8.5. The temperature is maintained at 20° to 25° C. throughout the addition. When addition of the ferric-ferrous chloride solution is completed, the sol is separated from the resin as rapidly as possible by filtration, and a solution composed of equal volumes of concentrated hydrochloric acid and iron salt solution identical to that used in preparing the sol is added until a pH of 1.5 is reached. Less than 4 ml. is required for adjustment of the pH. The stabilized gamma ferric oxide sol is stored under nitrogen for 16 to 20 hours and is analyzed. The results of various analyses are as follows:

pH _____ 1.7.
Average particle size determined by 7.2 millimicrons.
   electron microscopy.
Sol concentration as $Fe_2O_3$ _____ 9.8 g./l.
Distribution of ferric - ferrous iron 0.17 g./l. $Fe^{+3}$;
   determined by precipitation of the   1.96 g./l. $Fe^{+2}$.
   sol with magnesium sulfate and  6.87 g./l. $Fe^{+3}$;
   analysis continuous phase (filtrate).
Discontinuous phase (precipitate) ___ 0.40 g./l. $Fe^{+2}$.

EXAMPLE 2

In this example seven sols are prepared substantially as described in Example 1 with some variations in size of equipment, volume of resin slurry, iron salt feed solution, addition time, etc., as shown in the following table.

| Sol | Reactor Size, l. | Resin Exchange Capacity, meq./ml. | Resin slurry | | Iron Salt Feed Soln. | | | pH of Reaction Mixture | Volume of HCl/ $Fe^{+3}/Fe^{+2}$ Soln. Added, ml. | Sol Properties* | | Analysis * | | | |
|---|---|---|---|---|---|---|---|---|---|---|---|---|---|---|---|
| | | | Resin Volume (ml.) | Water Volume (ml.) | Volume (ml.) | $Fe^{+3}/Fe^{+2}$ Molar Ratio | Addition Time, sec. | | | pH | Gamma $Fe_2O_3$ Concentration, g./l. | Continuous Phase | | Discontinuous Phase | |
| | | | | | | | | | | | | $Fe^{+3}$, g./l. | $Fe^{+2}$, g./l. | $Fe^{+3}$, g./l. | $Fe^{+2}$, g./l. |
| 1 | 1 | 0.92 | 400 | 180 | 90 | 2.00 | 129 | 8–8.5 | 4.4 | 1.7 | 8.2 | 0.29 | 2.83 | 5.79 | 0.26 |
| 2 | 12 | 1.01 | 1,200 | 580 | 300 | 1.93 | 51 | 8–8.5 | 10.4 | 2.0 | 10.9 | 0.20 | 3.5 | 7.60 | 0.3 |
| 3 | 12 | 1.01 | 1,200 | 580 | 300 | 1.93 | 74 | 8–8.5 | 12.3 | 2.1 | 10.9 | 0.16 | 3.4 | 7.64 | 0.3 |
| 4 | 12 | 1.0 | 1,200 | 580 | 300 | 1.93 | 103 | 8–8.5 | 15.8 | 1.9 | 10.3 | 0.16 | 3.2 | 7.24 | 0.5 |
| 5 | 12 | 1.0 | 1,200 | 580 | 300 | 1.93 | 67 | 8–8.5 | 22.0 | 2.7 | 10.6 | 0.16 | 3.3 | 7.44 | 0.4 |
| 6 | 12 | 1.04 | 1,200 | 580 | 300 | 1.93 | 60 | 8–8.5 | 25.0 | 1.5 | 9.0 | 0.67 | 3.2 | 6.33 | 0.5 |
| 7 | 12 | 0.95 | 1,200 | 540 | 400 | 1.93 | 105 | 8–8.5 | 21.1 | 2.0 | 11.75 | 0.03 | 3.6 | 8.4 | 0.58 |

*After storage under nitrogen for 16–20 hours.

EXAMPLE 3

A process is described in this example which is suitable for preparing highly concentrated aquasols of gamma ferric oxide which are substantially free of ferrous and ferric ions. Eight-hundred milliliters of a gamma ferric oxide aquasol prepared by the method of Examples 1 and 2, having a pH of 1.7 and containing 10.3 g. per l. of ferric oxide, is placed in a regenerated cellulose dialysis bag which is submerged in a water-filled glass column. Tap water at 12° to 18° C. is passed downward through the column for 66 hours; during this time the ferric oxide precipitates as a soft gel. The dialyzed material is transferred to a beaker and allowed to settle, and the supernatant liquid is decanted. The remaining gel has a pH of 6.2 and contains nearly all of the ferric oxide originally present in the sol.

The gel obtained is vigorously agitated and a mixture of equal volumes of concentrated hydrochloric acid and water is added slowly until a pH of 1.5 is reached. The ferric oxide is completely redispersed during the addition. On standing, the pH slowly rises to 1.7. The product gamma ferric oxide sol has a ferric oxide particle size of 7 millimicrons and a concentration of 4.32 percent by weight.

EXAMPLE 4

Still more highly concentrated gamma ferric oxides are produced by modification of the process described in Example 3. The dialysis procedure in Example 3 is followed to produce a gel which is attracted to a magnet during decantation. The solid product is further concentrated by centrifugation, yielding a highly magnetic, compact gel containing about 13 percent, by weight) gamma ferric oxide.

The gel obtained is treated with a 10:1 mixture of nitrogen and hydrogen chloride gas until the pH reaches 1.5. Redispersion is complete; on standing the pH increases to 1.8. The ferric oxide concentration in the product sol is 12.9 percent by weight.

A portion of the sol is concentrated by distillation in vacuo at about 60° C. to a ferric oxide content of 18.4 percent. This product is stirred in a sealed atmosphere dried with magnesium perchlorate for 60 hours; where is obtained a sol containing 31.6 percent gamma ferric oxide.

EXAMPLE 5

A process is described in this example which is suitable for preparing concentrated organosols of gamma ferric oxide. To a gel prepared according to the dialysis procedure in Example 3 and containing 6.5 g. of ferric oxide is added a solution of 0.65 g. of ammonium oleate in 150 ml. of toluene. The mixture forms an emulsion on vigorous shaking. A second 150-ml. portion of ammonium oleate in toluene is added and shaking is continued. The mixture is distilled to remove 43 ml. of water and the insoluble material is filtered. Distillation is continued to remove excess toluene. The product is a gamma ferric oxide organosol containing 5.18 percent (by weight) ferric oxide.

EXAMPLE 6

Still more concentrated organosols are possible as illustrated by the following example which involves some variation from the process described in Examples 3 and 5. Sixteen-hundred milliliters of a gamma ferric oxide aquasol prepared by the method of Examples 1 and 2, having a pH of 1.7 and containing 0.99 weight percent gamma ferric oxide is placed in a regenerated cellulose dialysis bag which is submerged in a water-filled glass column. Tap water at a temperature of about 32° C. is passed downward through the column for 84 hours. A soft gel of gamma ferric oxide is obtained which, after centrifugation, weighs 78.9 g., has a pH of 7.4 and contains 13 weight percent ferric oxide. To this gel in a laboratory shaker is added 200 ml. of toluene containing ammonium oleate equal to 40 weight percent of the gamma ferric oxide in the gel. After 18 hours of agitation the contents of the shaker is centrifuged, which separates the toluene phase from an aqueous phase containing a small amount of solid residue. Azeotropic distillation is used to remove loosely bound water which is transferred with the sol into the toluene phase. Distillation for concentration of the gamma ferric oxide organosol by removal of toluene is continued until the desired concentration is obtained. In this example, a 38.8 weight percent gamma ferric oxide organosol is obtained.

It is to be understood that although the invention has been described with specific reference to particular embodiments thereof, it is not to be so limited, since changes and alterations therein may be made which are within the full intended scope of this invention as defined by the appended claims.

What is claimed is:

1. A stable sol wherein the discontinuous phase is gamma ferric oxide and the continuous phase is selected from the group consisting of water and non-polar organic liquids of aliphatic and aromatic hydrocarbons, said sol having a ferric oxide concentration of up to about 38% by weight, and said sol being capable of magnetic responses.

2. A stable aquasol of gamma ferric oxide having a ferric oxide concentration of up to about 35 percent by weight.

3. A stable organosol of gamma ferric oxide wherein the continuous phase is a non-polar organic liquid of aliphatic and aromatic hydrocarbons, the ferric oxide concentration being up to about 38% by weight, and said organsol being capable of magnetic responses.

4. The organosol of claim 3 wherein the liquid is a hydrocarbon.

5. The organosol of claim 3 wherein the liquid is an aromatic hydrocarbon.

6. The organosol of claim 3 wherein the ferric oxide particle size is between about 3 and about 12 millimicrons.

7. An organosol of gamma ferric oxide in toluene, having a ferric oxide concentration of up to about 38 percent by weight and a ferric oxide particle size between about 3 and about 12 millimicrons.

8. A method for the preparation of a stable aquasol of gamma ferric oxide which comprises the steps of (A)

slowly adding an aqueous solution of ferric and ferrous salts of monovalent anions, in which the molar ratio of ferric to ferrous ion is between about 3:1 and 1:1, to a vigorously agitated aqueous slurry of a strong-base anion exchange resin in the hydroxide form, said resin being present in about 3 to 200 percent excess; said addition being carried out at a rate and temperature such that the pH of the mixture is maintained between about 7.5 and 9.4; and (B) stabilizing the sol thus formed by reducing its pH to between 1 and 3 with sufficient rapidity to avoid precipitation of the ferric oxide.

9. The method of claim 8 wherein the anion exchange resin has a T½ value at room temperature no greater than 70.

10. The method of claim 8 wherein the resin is present in about 100 to 150 percent excess.

11. The method of claim 8 wherein the resin to water volume ratio in the resin slurry is not more than about 2.2:1.

12. The method of claim 8 wherein the molar ratio of ferric to ferrous ion is about 2:1.

13. The method of claim 8 wherein the pH of the sol is reduced by adding an aqueous solution selected from the group consisting of (1) solutions of mineral acids, (2) solutions of acidic metal halides and (3) mixtures of solutions from groups (1) and (2).

14. The method of claim 13 wherein the pH-lowering solution is an aqueous solution of ferric and ferrous salts of monovalent anions in which the molar ratio of ferric to ferrous ion is the same as that in the feed solution from which the sol is prepared.

15. The method of claim 13 wherein the pH-lowering solution is an aqueous solution of a mineral acid and ferric and ferrous salts of monovalent anions in which the molar ratio of ferric to ferrous ion is the same as that in the feed solution from which the sol is prepared.

16. The method of claim 8 wherein the stabilized sol is dialyzed to form a gel and said gel is separated and redispersed in water at a pH of 1 to 3.

17. A method for the preparation of a stable aquasol of gamma ferric oxide which comprises the steps of (A) slowly adding an aqueous solution of ferric chloride and ferrous chloride, in which the molar ratio of ferric to ferrous ion is about 2:1 and the total iron concentration is about 0.5 to 3 M, to a vigorously agitated aqueous slurry of a strong-base anion exchange resin in the hydroxide form, said resin having a T½ value at room temperature no greater than 70, and being present in about 100 to 150 percent excess, said aqueous resin slurry having a resin to water volume ratio of not more than about 2.2:1, the addition of said aqueous solution to said resin slurry being carried out in an inert atmosphere, at a temperature dependent upon the resin employed, and at a rate such that the pH of the mixture is maintained between 8.0 and 8.7; and (B) separating the sol thus formed from the resin and adding an aqueous solution of equal volumes of concentrated hydrochloric acid and an iron salt solution identical to that used in preparing said sol, until the pH of said sol is about 1.5, the addition being done with sufficient rapidity so that there is no precipitation of ferric oxide.

18. The method of claim 17 wherein the stabilized sol is dialyzed at about 10° to 30° C. to form a gel, and said gel is separated from excess water and is redispersed in water at a pH of about 1.5 to form an aquasol of substantially higher concentration than that of the original aquasol.

19. A method for the preparation of a gamma ferric oxide organosol which comprises the steps of forming a gamma ferric oxide aquasol by the method of claim 13; dialyzing said aquasol to form a gel and separating said gel from excess water; contacting said gel with a solution in a non-polar organic liquid of a lyophillic anionic transfer agent of an ammonium salt of long-chain fatty acids, said organic liquids being selected from the group consisting of aliphatic and aromatic hydrocarbons; and separating the organosol thus formed from the aqueous and solid phases.

20. The method of claim 19 wherein the organic liquid is a hydrocarbon.

21. The method of claim 19 wherein the organic liquid is an aromatic hydrocarbon.

22. The method of claim 19 wherein the organic liquid is toluene.

23. The method of claim 19 wherein the transfer agent is ammonium oleate.

24. A method for the preparation of a gamma ferric oxide organosol which comprises the steps of forming a gamma ferric oxide aquasol by the method of claim 22; dialyzing said aquasol at about 10° to 30° C. to form a gel and contacting the gel thus formed with a solution of ammonium oleate in toluene, the amount of said ammonium oleate being about 20 to 50 percent, by weight, of the amount of ferric oxide in said gel; and separating the organosol thus formed from the aqueous and solid phases.

References Cited

UNITED STATES PATENTS

| | | | |
|---|---|---|---|
| 1,269,442 | 6/1918 | Hoffman | 106—304 |
| 2,426,020 | 8/1947 | Hauck | 252—313 X |
| 2,689,168 | 9/1954 | Dovey et al. | 106—304 X |
| 3,198,603 | 8/1965 | MacCallum et al. | 252—313 X |
| 3,198,743 | 8/1965 | MacCallum et al. | 252—313 |

FOREIGN PATENTS 247,240  9/1963  Australia.

RICHARD D. LOVERING, Primary Examiner

U.S. Cl. X.R.

23—200; 106—304; 252—62.52, 309, 313

UNITED STATES PATENT OFFICE
CERTIFICATE OF CORRECTION

Patent No. 3,480,555　　　　Dated November 25, 1969

Inventor(s) William M. Jackson and Frank W. Hengeveld

It is certified that error appears in the above-identified patent and that said Letters Patent are hereby corrected as shown below:

Column 6, line 64, "6.87 g./l. $Fe^{+3}$" should be transferred to line 68, column 6, under "0.40 g./l. $Fe^{+2}$".

SIGNED AND
SEALED
MAR 10 1970

(SEAL)
Attest:

Edward M. Fletcher, Jr.
Attesting Officer

WILLIAM E. SCHUYLER, JR.
Commissioner of Patents